US005507013A

United States Patent [19]
Weadon et al.

[11] Patent Number: 5,507,013
[45] Date of Patent: Apr. 9, 1996

[54] PREFERENTIAL DEFLECTION HINGED HOUSING CONFIGURATION

[75] Inventors: Mark W. Weadon, Eden; Steven J. Harms, Raleigh, both of N.C.

[73] Assignee: Ericsson GE Mobile Communications, Inc., Research Triangle Park, N.C.

[21] Appl. No.: 247,286

[22] Filed: May 23, 1994

[51] Int. Cl.⁶ .................................................. H04B 1/38
[52] U.S. Cl. .......................... 455/90; 455/347; 455/351; 379/428; 379/430; 379/433; 16/257; 16/334; 49/383
[58] Field of Search ................................ 455/89, 90, 344, 455/346, 347, 348, 349, 351; 379/428, 433, 434, 430; 16/257, 334; 49/394, 383; 248/292.12; 206/305, 320

[56] References Cited

U.S. PATENT DOCUMENTS

| | | | |
|---|---|---|---|
| D. 282,738 | 2/1986 | Nichols | D14/53 |
| D. 304,189 | 10/1989 | Nagele et al. | D14/147 |
| 4,845,772 | 7/1989 | Metroka et al. | 379/433 |
| 4,897,873 | 1/1990 | Beutler et al. | 379/433 |
| 5,185,790 | 2/1993 | Mischneko | 379/433 |
| 5,259,019 | 11/1993 | Stilley | 379/58 |
| 5,357,570 | 10/1994 | Tomura et al. | 379/433 |

FOREIGN PATENT DOCUMENTS

| | | | |
|---|---|---|---|
| 0135960 | 8/1984 | Japan | 379/428 |
| 0135959 | 8/1984 | Japan | 379/428 |
| 0164743 | 7/1988 | Japan | 379/434 |
| 0212051 | 8/1989 | Japan | 379/434 |
| 0091541 | 3/1992 | Japan | 379/433 |
| 0252245 | 9/1993 | Japan | 379/428 |

Primary Examiner—Reinhard J. Eisenzopf
Assistant Examiner—Doris To
Attorney, Agent, or Firm—Bell, Seltzer, Park & Gibson

[57] ABSTRACT

A hinge configuration particularly suitable for use with a radiotelephone includes: an arcuate hinge body having a predetermined body length, a predetermined body thickness and a predetermined radius of curvature; and a pair of arms, a respective one of which is attached to and extends away from a respective end of the arcuate hinge body, the pair of arms each having predetermined arm lengths and predetermined arm thicknesses. The arms are pivotally mounted on a housing such that the arms twist upon pivotal movement of the arcuate hinge body relative to the housing. At least one of the predetermined body length, predetermined body thickness, predetermined radius of curvature, predetermined arm lengths and predetermined arm thicknesses should be selected to induce preferential deflection in the arcuate hinge body relative to the pair of arms upon twisting thereof during pivotal movement of the hinge body so that the arms resist fracture during such repeated pivotal movement.

35 Claims, 4 Drawing Sheets

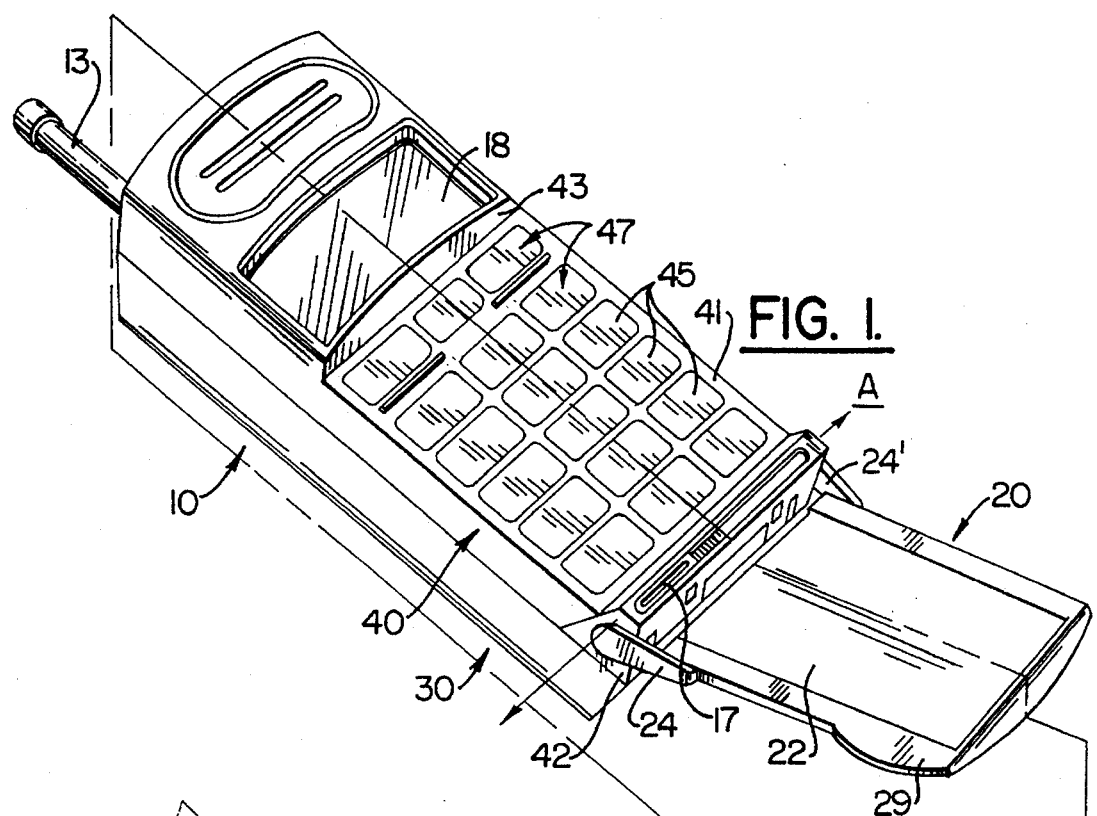
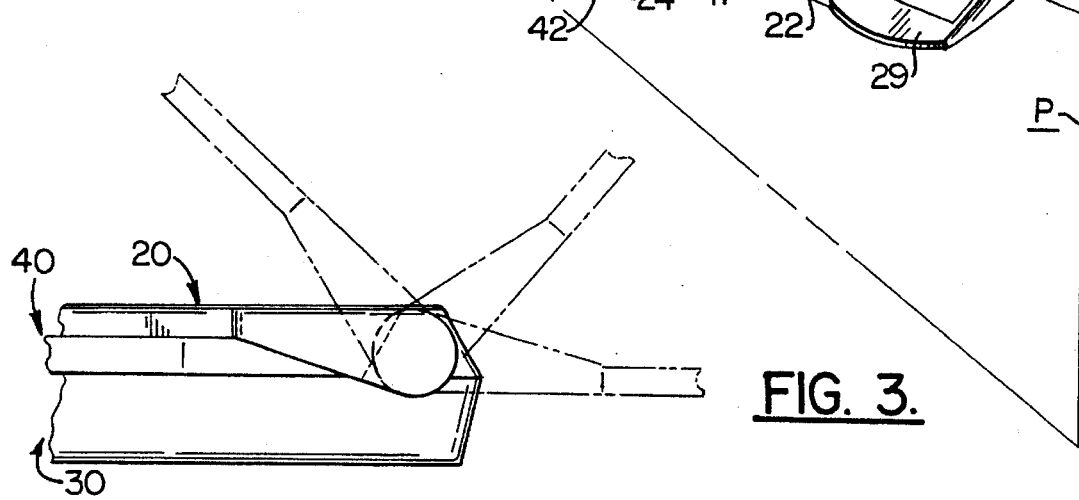
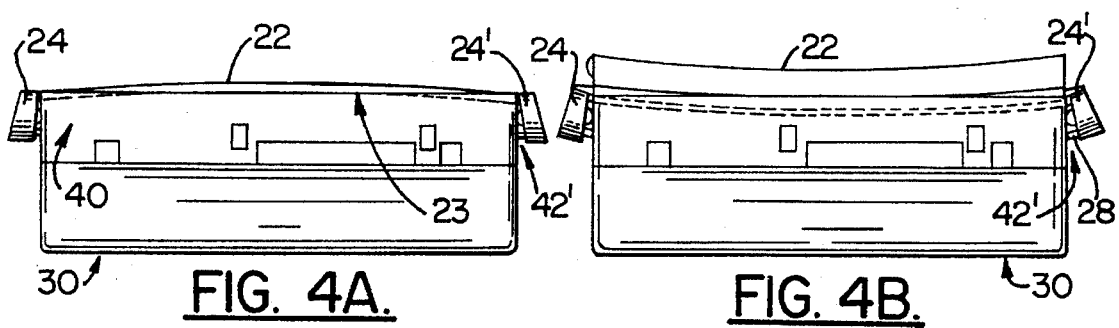

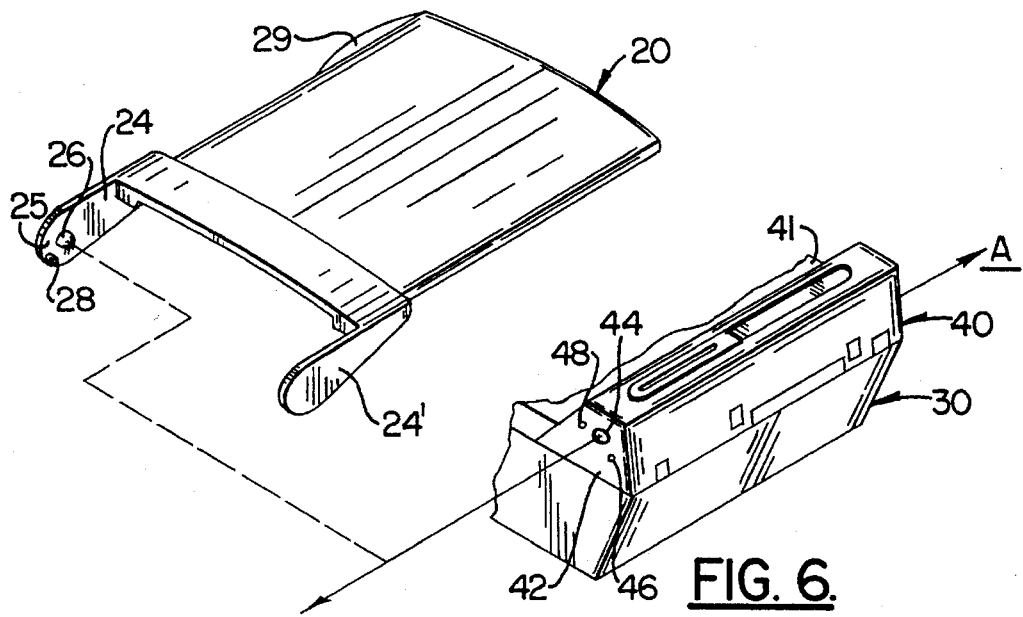
FIG. 6.
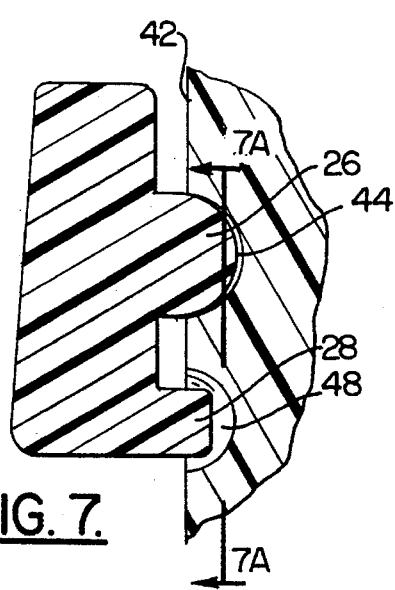
FIG. 7.
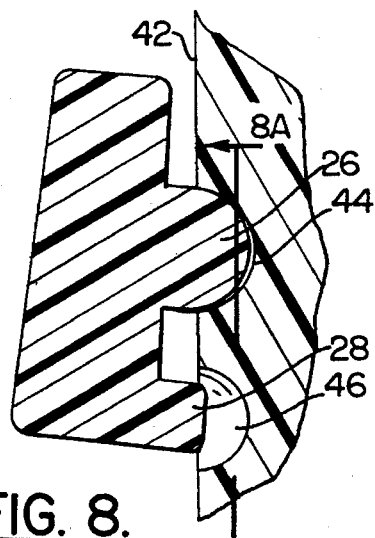
FIG. 8.
FIG. 7A.
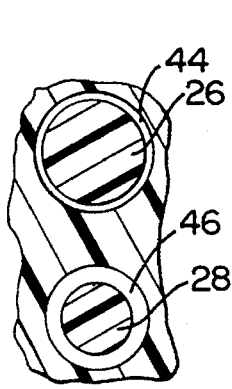
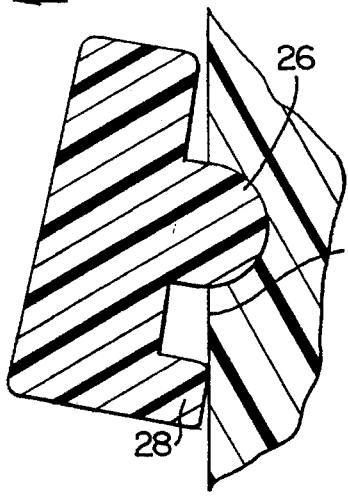
FIG. 9.
FIG. 8A.

PREFERENTIAL DEFLECTION HINGED HOUSING CONFIGURATION

FIELD OF THE INVENTION

The present invention relates generally to hinge configurations, and relates more particularly to hinge configurations for articles pivoting between operative and inoperative positions.

BACKGROUND OF THE INVENTION

The portable radiotelephone, also known as a "cellular" telephone, has become an increasingly popular item for both personal and commercial use. Some users, such as doctors, salespersons, real estate brokers, and the like, often find that carrying a telephone on their person or in a motor vehicle is quite helpful and convenient, and in some instances almost essential, to perform their professional tasks.

To further increase the convenience afforded by radiotelephones, the trend has been for radiotelephone units to be increasingly smaller for easier storage and portability. To this end, the "flip" phone was developed. A flip phone, an example of which is shown in Design U.S. Pat. No. 304,189 to Nagele et al., comprises a handset portion and a "flip" portion. The handset portion houses push buttons for activating the radiotelephone and sending dialing tones, a signal receiving unit and amplifier, and other components associated with the operation of the radiotelephone. The flip portion, which may house the mouthpiece and associated microphone, is hingedly attached to one end of the handset portion. The flip portion overlies and contacts a portion of the handset portion when the phone is inoperative. To operate the phone, the flip portion is pivoted to an open position in which it forms an angle of approximately 135 degrees with the handset portion. In this position, the phone is configured so that when the speaker is placed adjacent a user's ear, the mouthpiece microphone is positioned adjacent a user's mouth; as a result, the flip phone can be used in much the same manner as a conventional radiotelephone. The popularity of the flip phone is in large part due to the ability of the phone to fold very compactly into the closed position when not in use.

The radiotelephone typically includes structures that lock the flip cover into the both the closed and the open positions. It is particularly important that the flip cover lock snugly into the closed position; otherwise, agitation or other movement of telephone, particularly to a position in which the cover faces downwardly, may cause the phone to be activated inadvertently. It is also important that the cover lock snugly in the operative position for the user's convenience.

Because the phone relies on pivotal movement of the flip portion for its operation, the configuration and, in turn, the operation of the hinge interconnecting the flip portion with the handset can greatly influence the performance and attractiveness of the phone. The hinge may be subjected to significant levels of stress, and in particular to fatigue-based stress, due to repeated cycling of the flip portion between the operative and closed positions. If the hinge becomes fatigued after repeated pivoting cycles, it may loosen to such a degree that it does not remain in a desired position; alternatively, the hinge may fracture. Both loosening and fracture can lead to inconsistent operation of the phone.

In addition, it is desirable that, when the cover is in the closed position, it be biased toward the closed position. If biasing means are present, any slight movement of the phone that could otherwise jostle the cover out of the closed position (and thus activate the phone) will not do so. Typically biasing is provided by some type of wire spring connected with the hinge, see U.S. Pat. No. 4,897,873 to Beutler; U.S. Pat. No. 5,259,019 to Stilley. However, the inclusion of an additional component, such as a wire spring, can add both material and labor costs to the phone.

Further, it is desirable that the phone be capable of taking a conformation in which it can be placed on an underlying surface while in operation to enable the user the freedom to do so. Typically in this conformation the flip cover pivots to a position approximately 180 degrees from its closed position. In this position the operating phone can be placed upside-down on an underlying surface to free the user's hands without disconnecting the phone. See Design U.S. Pat. No. 282,738 to Nichols for an exemplary phone capable of such a configuration. Thus the hinge configuration of a radiotelephone should be include the capability of pivoting the cover to a fully open position without the operation of the hinge in the closed and operative positions being adversely affected.

SUMMARY OF THE INVENTION

In view of the foregoing, it is an object of the present invention to provide a hinge for a "flip"-style phone which is able to withstand repeated opening and closing of the flip portion without fracturing or fatiguing to such a degree that operation of the phone is affected.

It is another object of the present invention to provide a hinge configuration suitable for use with a flip-style phone that locks the flip cover into a closed position and an operative position.

It is a further object of the present invention to provide a hinge configuration suitable for use with a flip-style phone that biases the flip cover to remain in its closed position.

It is also an object of the present invention to provide a hinge configuration suitable for use with a flip-style phone that permits the flip cover to pivot to a fully open position that enables the phone to be placed upside-down on an underlying surface without disconnecting the phone.

These and other objects are satisfied by the present invention, which provides a hinge configuration particularly suitable for a radiotelephone. The hinge configuration comprises an arcuate hinge body, such as a flip cover, a pair of arms attached to and extending away from a respective end of the hinge body, and pivotal mounting means for mounting the hinge body on a housing so that each of the arms twists upon pivotal movement of the arcuate hinge body relative to the housing. At least one of the body width, body thickness, body radius of curvature, arm length, and arm thickness is selected to induce preferential deflection of the arcuate hinge body relative to the pair of arms upon twisting of the arms during pivotal movement of the hinge body.

This preferential deflection of the hinge body causes the hinge body to act as a spring during pivotal movement thereof, which in turn causes the arms to resist fracture during repeated pivotal movement. Also, the ability of the hinge body to act as a spring can, with proper selection of at least one of the dimensions of the hinge body and arms noted above, produce sufficient force directed toward the housing by the arms that the hinge member resists separation from the housing during repeated pivotal movement thereof.

In a preferred embodiment, the mounting means comprises a pair of pivot nubs extending from the arms that are sized and configured to mate with and pivot within a pair of pivot recesses located in the housing. The hinge further comprises first and second retaining means that retain the hinge body in, respectively, a first closed position and a second operative position. For a radiotelephone, the flip cover is in the closed position as it overlies the handset. In this position, the radiotelephone is deactivated.

Moving the cover to the operative position enables the telephone to be activated for operation. In the operative position, the flip cover pivots to form an angle of between about 100 and 160 degrees, and more preferably between about 120 and 150 degrees, with the housing, which places the cover in position to assist in the acoustical transmission of the user's voice to the microphone of the radiotelephone. It is also preferred that the cover be able to move to a fully open position, in which the cover pivots to form an angle of between about 170 and 200 degrees, that allows the radiotelephone to be placed with the mouthpiece and earpiece facing an underlying surface. This enables the user to set down the phone with the mouthpiece and earpiece insulated from sound without deactivating the phone.

BRIEF DESCRIPTION OF THE DRAWINGS

FIG. 1 is a perspective view of a radiotelephone having a hinged cover shown in its operative position.

FIG. 3 is a fragmentary front view of a radiotelephone showing the cover in phantom line in its closed, intermediate, operative, and fully open positions.

FIG. 4A is an end view of a radiotelephone showing the cover in its closed position.

FIG. 4B is an end view of a radiotelephone showing the cover in an intermediate position.

FIG. 6 is an exploded fragmentary perspective view of the cover and housing showing the interaction between the pivot nub and pivot recess.

FIG. 7 is a sectional view taken along line 7—7 of FIG. 5C showing the interaction between the locator post and the operative position locator recess in the operative position.

FIG. 7A is a sectional view taken along line 7A—7A of FIG. 7 showing the orientation of the locator post within the operative position locator recess.

FIG. 8 is a sectional view taken along line 8—8 of FIG. 5A showing the interaction between the locator post and the closed position locator recess in the closed position.

FIG. 8A is a sectional view taken along line 8A—8A of FIG. 8 showing the orientation of the locator post within the closed position locator recess.

FIG. 9 is a sectional view taken along line 9—9 of FIG. 5B showing the interaction between the locator post and the lateral wall in an intermediate position.

DETAILED DESCRIPTION OF THE INVENTION

The present invention now will be described more fully hereinafter with reference to the accompanying drawings, in which a preferred embodiment of the invention is shown. This invention may, however, be embodied in many different forms and should not be construed as limited to the embodiments set forth herein; rather, this embodiment is provided so that this disclosure will be thorough and complete, and will fully convey the scope of the invention to those skilled in this art.

Figure 2:
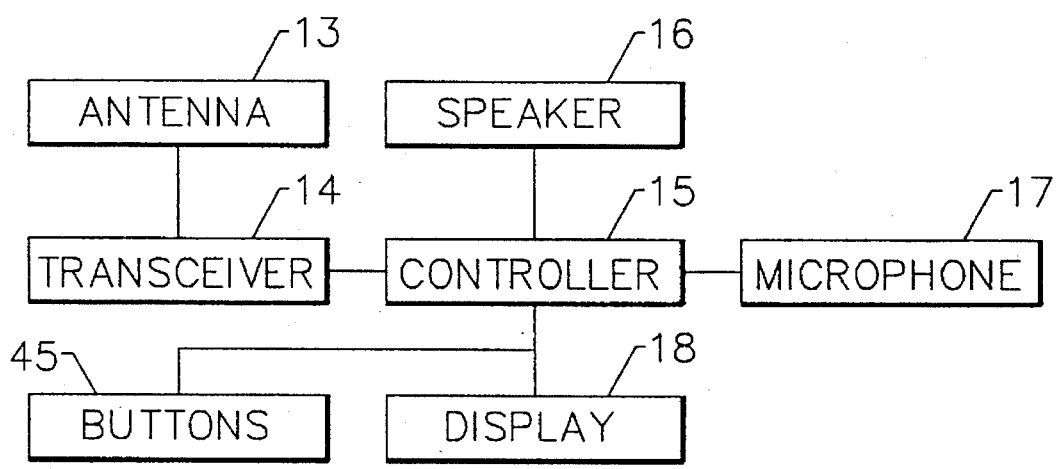
FIG. 2 is a block diagram illustrating the connections between typical electrical components of a radiotelephone of the present invention.

Referring now to the drawings, a radiotelephone, designated broadly at 10, is shown in FIG. 1. The radiotelephone 10 comprises a top handset housing 40, a bottom handset housing 30 connected thereto to form a cavity therein, and a flip cover 20 attached to one end of the top housing 40. These parts house electronic components that enable the radiotelephone 10 to transmit and receive telecommunication signals. A typical arrangement of these electronic components is shown schematically in FIG. 2. An antenna 13 (also visible in FIG. 1) for receiving telecommunication signals is electrically connected to a radio-frequency transceiver 14 that is further electrically connected to a controller 15, such as a microprocessor. The controller 15 is then electrically connected to a speaker 16 that transmits a remote signal from the controller 15 to a user of the radiotelephone 10. The controller 15 is also electrically connected to a microphone 17 that receives a voice signal from a user and transmits it through the controller 15 and transceiver 14 to a remote device. Further, the controller 15 is electrically connected to a plurality of push buttons 45 and to a display 18 that facilitate phone operation. Those skilled in this art will appreciate that radiotelephones having other electronic components are also suitable for use with the hinge configuration of the present invention, as are other devices, such as tone dialers, which benefit from the inclusion of a cover pivotable between closed and operative positions.

Figure 5A:
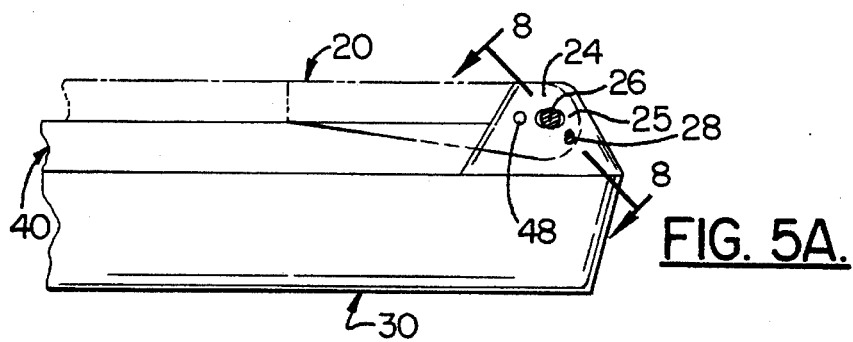
FIG. 5A is a fragmentary front view of a radiotelephone showing the cover in its closed position.
Figure 5B:
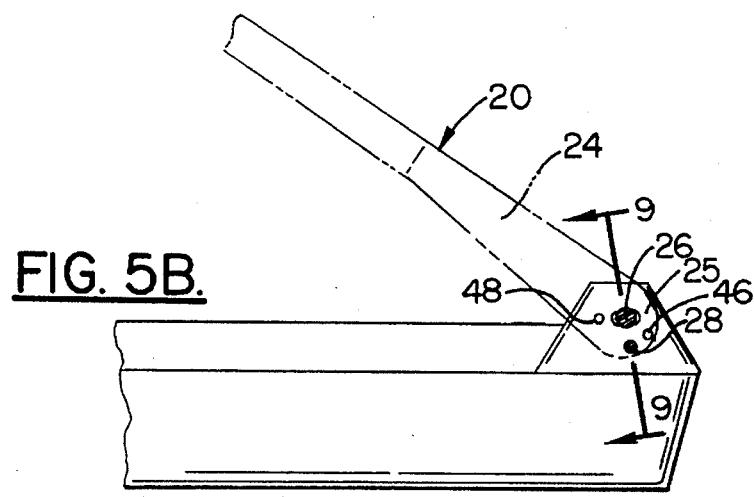
FIG. 5B is a fragmentary front view of a radiotelephone showing the cover in its intermediate position.
Figure 5C:
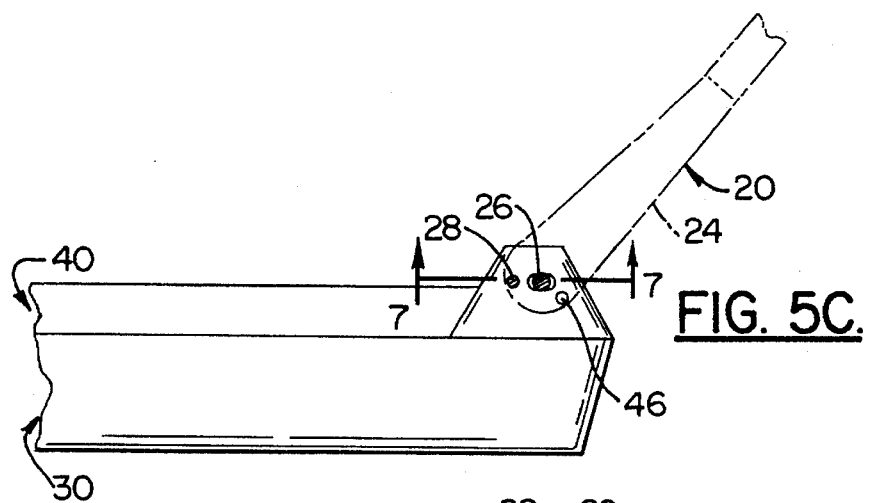
FIG. 5C is a fragmentary front view of a radiotelephone showing the cover in its operative position.
Figure 5D:
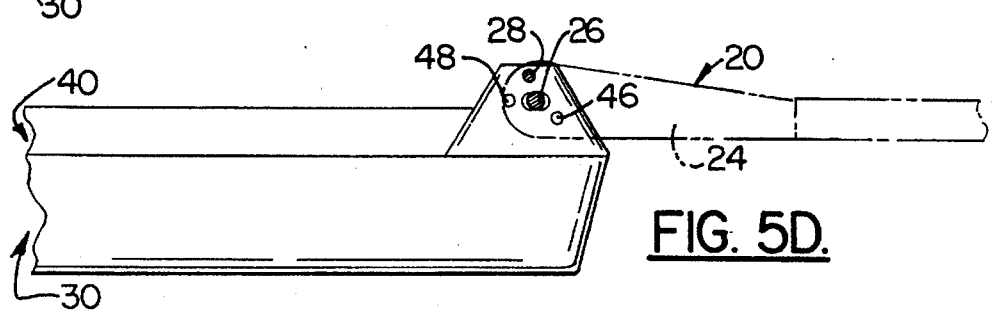
FIG. 5D is a fragmentary front view of a radiotelephone showing the cover in its fully open position.

In operation, the flip cover 20 pivots relative to the top housing 20 between a closed position (FIGS. 3 and 5A), an operative position (FIGS. 3 and 5C), and a fully open position (FIGS. 3 and 5D). In the closed position, the flip cover 20 overlies the top housing 40, preferably in contacting relationship. In the operative position, the flip cover 20 has pivoted about a pivot axis A (FIG. 1) relative to the top housing 40 between about 100 and 160 degrees, and preferably between about 130 and 140 degrees, from the closed position. The radiotelephone 10 is typically operated in this position; the cover 20 has "flipped" into a position in which it assists in the acoustical transmission of the user's voice to the microphone 17 as the opposite end of the top housing 40 serves as an earpiece for the user. For some embodiments, the radiotelephone 10 includes operation activation means that are operably coupled with the cover 20 such that pivotal movement of the cover 20 toward the operative position activates the radiotelephone 10 for use. See U.S. Pat. No. 5,278,993 to Reiff et al. for an exemplary activation unit. As used herein, the term "activate" and derivatives thereof used in connection with the operation of the radiotelephone 10 indicate that the radiotelephone has been connected with a telephone service and either can be or has been further connected with a remote telephonic device, such as another telephone, a facsimile machine, or the like. In layman's terms, an "activated" telephone is one which receives a "dial tone" from a telephone service or which is connected with another telephone line. Thus the term "activated" is intended to be synonymous with the art-recognized term "off-hook." Conversely, the term "deactivate" and derivatives thereof refer to a radiotelephone 10 is not connected with another telephone line or with a telephone service transmitting a dial tone; i.e., the term is intended to be synonymous with the art-recognized term "on-hook."

The flip cover 20 (FIGS. 1 and 6) comprises an arcuate hinge body 22, a pair of arms 24, 24' and an operation flange 29. The hinge body 22 extends between and supports each of the arms 24, 24'. The hinge body 22 is preferably slightly arcuate; it bows so that the center portion of its inner surface 23 (the surface that faces the top housing 40 when the cover 20 is in the closed position) is spaced away from the top housing 40 slightly more than its lateral edge portions (FIG. 4A). The hinge body 22 should be sufficiently wide that it covers the full width of the top housing 40. Typically, this width is between about 100 and 200 millimeters and preferably is between about 135 and 150 millimeters. Preferably, the radius of curvature of the hinge body 22 is between about 100 and 500 millimeters, and is more preferably between about 250 and 400 millimeters. The thickness of the hinge body 22 is preferably between about 1.0 and 2.0 millimeters. The thickness, radius of curvature, and width (the dimension between the arms 24, 24') of the hinge body 22 should be selected so that the hinge body 22 preferentially deflects upon twisting of the arms 24, 24' (FIG. 4B). As used herein, a structure "preferentially deflects" relative to another structure if it deflects significantly in response to an induced stress and the second structure does not. By preferentially deflecting, the hinge body 22 is able to act as a spring, thereby reducing the magnitude of the stress induced in the arms. Also, these same dimensions should be selected so that the hinge body 22 does not deflect to such a degree that the cover 20 separates from the housing 40 upon twisting of the arms 24, 24' due to pivoting of the cover 20.

Each of the arms 24, 24' (FIG. 6) is attached to and extends from a respective end of the hinge body 22. Each of the arms 24, 24' is a mirror image of the other arm of the pair about a plane of symmetry P bisecting the hinge body 22 equidistant between the arms 24, 24' and normal to the pivot axis A. In the interest of clarity and brevity, only the arm 24 will be described herein in detail. Those skilled in this art will appreciate that the ensuing discussion is equally applicable to the arm 24'.

In referring to the positions of structures of the arm 24 relative to other structures of the radiotelephone 10, the terms "inward," "inwardly," and derivatives thereof refer to the direction defined by a vector originating at either arm 24, 24' and extending toward the plane of symmetry P. Conversely, the terms "outward," "outwardly," "lateral," and derivatives thereof refer to the direction opposite the inward direction; i.e., the direction defined by a vector originating at the plane of symmetry P and extending normal thereto.

As shown in FIGS. 5A through 5D and 6, the arm 24 has a rounded free end 25 opposite the end attached to the hinge body 22. The free end 25 includes a hemispherical pivot nub 26 and a cylindrical locator post 28, each of which is located on and projects inwardly from the inward surface of the free end 25. The pivot nub 26 and its corresponding pivot hub on the arm 24' are coincident with and define the pivot axis A. The pivot nub 26 should protrude further inwardly than the locator post 28 to encourage the cover 20 to remain interconnected with the top housing 40 during pivoting of the cover 20; in the illustrated embodiment, the pivot nub 26 protrudes between about 1 and 1.5 millimeters from the arm 24, and the locator post 28 projects between about 0.8 and 1 millimeter from the arm 24. To further encourage the pivot nub 26 to remain interconnected with the top housing 40, it is preferred that the locator post 28 be spaced away from the pivot nub 26 as much as is practical and that the locator post 28 be positioned near a line extending through the attachment point of the arm 24 to the hinge body 22 and the pivot nub 26. Preferably, the arm 24 is between about 10 and 20 millimeters in length and between about 1.0 and 3.5 millimeters in width.

The top housing 40 includes a face plate 41 and a pair of lateral walls 42, 42' (FIGS. 1 and 6). The face plate 41 includes a contact surface 43 that contacts the cover 20 as it resides in the closed position. The face plate 41 illustratively and preferably includes a number of apertures 47 that receive push buttons 45 that are used to operate the radiotelephone 10.

The lateral walls 42, 42' are mirror images of one another about the plane of symmetry P. For clarity and brevity, only the lateral wall 42 will be described in detail herein; those skilled in this art will appreciate that the discussion is equally applicable to the lateral wall 42'.

The lateral wall 42 includes a pivot recess 44, a closed position dimple 46, and an operative position dimple 48 (FIG. 6). Each of these recesses is substantially hemispherical; the pivot recess 44 is preferably between about 1.5 and 2.5 millimeters in diameter, and the locator dimples 46, 48 are between about 1.2 and 1.8 millimeters in diameter. Each of the locator dimples 46, 48 are positioned on the lateral wall 42 approximately equidistant from the pivot recess 44. The closed position locator dimple 46 is positioned to receive the locator post 28 when the cover 20 is in its closed position. The operative position locator dimple 48 is positioned to receive the locator post 28 when the cover 20 is in its operative position. Preferably, these dimples 46, 48 are oriented about the pivot recess 44 so that line segments extending between (a) the closed position locator dimple 46 and the pivot recess 44 and (b) the pivot recess 44 and the operative position locator dimple 48 form an angle of between about 100 and 160 degrees, and more preferably form an angle of between about 130 and 140 degrees. This chosen angle should correspond to the angle formed by the faceplate 41 and the cover 20 when the cover 20 is in the operative position.

The cover 20 and the top housing 40 are interconnected so that the pivot nubs 26 of the arms 24, 24' are received within the pivot recesses 44 of the lateral walls 42, 42' (FIG. 6). When the pivot nubs 26 are so received, the cover 20 is free to pivot about the pivot axis A. In its closed position, the cover 20 rests against the contact surface 43, and locator post 28 is received within the closed position locator dimple 48 (FIGS. 5A and 8).

Biasing the cover 20 toward the contact surface 43 of the top housing 40 when the cover 20 is in its closed position is achieved by the positioning of the closed position locator dimple 46 on the lateral wall 42. The dimple 46 is positioned on an imaginary circle defined by the pivot recess 44 (the circle's center) and the dimples 46, 48 (points on the circle's circumference). The locator post 28 remains on this circular path as the cover 20 moves between its different positions. As the cover 20 moves to the closed position, the interaction between the cover 20 and the contact surface 43 of the top housing halts the movement of the cover 20, so the locator post 28 stops at a point on the imaginary circle. The center of the dimple 46 is then positioned at a point on the imaginary circle just beyond that reached by the locator post 28 in the closed position. For the illustrated embodiment, the center of the closed position locator dimple 46 is positioned approximately 2.5 degrees on the imaginary circle beyond the locator post point. As a result, the locator post 28 is not positioned in the center of the dimple 46, but instead is eccentrically positioned therein. The interaction between the post 28 and the curvilinear surface of the dimple 46 urges the cover 20 toward the contact surface 43 (FIGS. 8 and 8A). As a result, the cover 20 tends to remain in the closed position even if the radiotelephone 10 is inverted so that the cover 20 faces downwardly.

From the closed position, an upwardly directed force on the flange 29 of the cover 20 causes the cover 20 to pivot about the pivot axis A as the pivot nubs 26 rotate within the pivot recesses 44. Each of the locator posts 28 slides from its position within the closed position dimple 46 to a position in which the locator post 28 contacts the lateral wall 42 (FIGS. 5C and 9). Such contact forces the arms 24, 24' to twist, with the portions thereof attached to the locator posts 28 being forced away from the lateral walls 42.

While the cover 20 is in an intermediate position, the twisting action of the arms 24, 24' induces a bending movement in the hinge body 22. At least one of the thickness, radius of curvature, and width of the hinge body 22 and the thickness and width of the arms 24, 24' is selected so that, under such a bending movement and the stress resulting therefrom, the hinge body 22, rather than the arms 24, 24', preferentially deflects (see FIG. 4B). By selecting one or more of the above-noted dimensions so that the hinge body 22 preferentially flexes, the fatigue life of the cover 22 can increase dramatically. If the hinge body 22 does not preferentially flex, repeated cycling of the cover 20 between the closed and intermediate positions causes the cover 20 to fracture at the junction between the arms 24, 24' and the hinge body 22, and to do so after far fewer cycles.

At least one of the thickness, radius of curvature, and width of the hinge body 22 and the width and thickness of the arms 24, 24' should be chosen so that, as the cover is in the intermediate position, the pivot nubs 26 of the arms 24, 24' exert sufficient gripping force on the pivot recesses 44 to resist separation of the cover 20 from the top housing 40 during pivotal movement (FIG. 4B). Because the hinge body 22 preferentially deflects relative to the arms 24, 24' and thus acts as a spring, its deflection causes the arms 24, 24' to exert a resistive inwardly-directed force. This force should be sufficient to prevent the cover 20 from separating from the top housing 40 even after repeated pivotal movements.

The cover 20 can be pivoted into its operative position (FIGS. 5C and 7) by continuing to apply a force normal to the flange 29. In the operative position, the locator post 28 resides within the operative position dimple 48 (FIGS. 7 and 7A). The interaction between the locator post 28 and the dimple 48 causes the cover 20 to be locked into the operative position. In its operative position, the radiotelephone 10 can be activated for telephonic communication, and the cover 20 can serve to assist the acoustical transmission of the cover's voice to the microphone 17.

Preferably and illustratively, the cover can also be moved into the fully open position shown in FIGS. 3 and 5D. In this position, the radiotelephone 10 can be inverted and placed on a horizontal surface. This can be desirable if a user wishes to rest the radiotelephone 10 on a flat surface in a stable configuration as it is being used without disconnecting the telephonic signal (as would occur if the cover 20 was moved to the closed position). In the illustrated embodiment, placement of the radiotelephone 10 on such a surface can soundproof the microphone 17 from outside noise, with the result that placing the radiotelephone 10 so that the faceplate 41 faces an underlying surface effectively acts to put a caller on "hold." In the fully open position, the locator post 28 contacts the lateral wall 42, the arms 24, 24' twist, and the hinge body 22 preferentially deflects as in the intermediate position.

Typically, the cover 20, the top housing 40, and the bottom housing 30 are formed of the same material so that the color and gloss of these separate components can be matched. Preferably, these components are formed of a thermoplastic, with polycarbonate being particularly preferred. Those skilled in this art will appreciate, however, that other materials may also be suitable for use with this invention.

Those skilled in this art will appreciate that, although the combination of the locator post 28 and the dimples 46, 48 is preferred, any means of retaining the cover 20 in the closed and operative positions which induces a bending moment in the hinge body 22 during pivotal movement is suitable for use with the present invention. For example, the locator post 28 and dimples 46, 48 could be switched so that the locator post 28 is positioned on the lateral wall 42, 42' and the dimples 46, 48 are located on the arms 24, 24'.

The hinge configuration of the present invention enables a flip-style radiotelephone to have a cover that moves smoothly between closed, operative, and fully open positions, and to do so without fracturing after the large number of pivoting cycles typically experienced by such devices. Further, the cover exerts sufficient gripping force on the housing that repeated pivotal cycles do not cause the cover to separate from the housing.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed is:

1. A hinge configuration comprising:

an arcuate hinge body having a predetermined body width, a predetermined body thickness and a predetermined radius of curvature;

a pair of arms, a respective one of which is attached to and extends away from a respective end of said arcuate hinge body, said pair of arms each having predetermined arm lengths and predetermined arm thicknesses;

means for pivotally mounting said pair of arms on a housing such that said pair of arms twist upon pivotal movement of said arcuate hinge body relative to the housing;

at least one of said predetermined body width, predetermined body thickness, predetermined radius of curvature, predetermined arm lengths and predetermined arm thicknesses being selected to induce preferential deflection in said arcuate hinge body relative to said pair of arms upon twisting of said pair of arms during pivotal movement of said pair of arms, such that said pair of arms resist fracture during repeated pivotal movement.

2. The hinge configuration defined in claim 1 wherein said at least one of said predetermined body width, predetermined body thickness, predetermined radius of curvature, predetermined arm lengths and predetermined arm thicknesses are further selected to produce sufficient lateral gripping force between said pair of arms such that said hinge body resists separation from said housing during repeated pivotal movement of said pair of arms.

3. The hinge configuration defined in claim 2 wherein said pivotally mounting means includes a dimple between each of said arms and said housing and wherein said at least one of said predetermined body width, predetermined body thickness, predetermined radius of curvature, predetermined arm lengths and predetermined arm thicknesses are further selected such that said lateral contacting force between said pair of arms is sufficiently small to prevent wear of said dimples during repeated pivotal movement of said pair of arms.

4. The hinge configuration defined in claim 1 wherein said predetermined radius of curvature is between 250 and 400 millimeters, said predetermined thickness is between 1.0 and 2.0 millimeters, and said predetermined body width is between 135 and 150 millimeters.

5. The hinge configuration defined in claim 1 in combination with a housing, said pair of arms being mounted pivotally thereon.

6. The hinge configuration defined in claim 5 wherein said arcuate hinge body is a flip cover for a cellular telephone.

7. The hinge configuration defined in claim 6 wherein said flip cover includes a cellular telephone microphone therein.

8. The hinge configuration defined in claim 5 wherein said housing is a cellular telephone housing.

9. The hinge configuration defined in claim 8 wherein said cellular telephone housing includes a cellular telephone transceiver, an antenna electrically connected thereto and a cellular telephone controller electrically connected thereto.

10. A hinge configuration comprising:

a first member comprising a flexible hinge body and a pair of arms attached to and extending away from opposite lateral portions thereof, a second member comprising a hinge body and a pair of opposing lateral walls;

pivotal interconnecting means attached to each of said arms and each of said lateral walls for pivoting said first member relative to said second member about a pivot axis between a first closed position and a second open position, said pivot axis being generally perpendicular to a plane bisecting said flexible hinge body equidistant between said arms;

first means for retaining said first member in the closed position;

second means for retaining said first member in the open position;

wherein said first and second retaining means are configured so that as said first member moves between the open and the closed positions, said arms twist, thereby inducing a bending moment in said flexible hinge body, and wherein said flexible hinge body and said arms are configured so that, in response to such twisting and bending moment, said flexible hinge body preferentially flexes relative to said arms, thereby reducing the tendency for one of said arms to fracture.

11. The hinge defined in claim 10, wherein said pivotal interconnecting means comprises:

a pair of nubs, each of which is attached to and extends from a respective one of said arms, and each of which extends from said arms so that its longitudinal axis coincides with said pivot axis; and a pair of receiving pivot recesses sized to receive said nubs, each of which is located in a respective one of said pair of lateral walls, and each of which is located on said pivot axis.

12. The hinge defined in claim 11, wherein said first retaining means comprises:

a post projecting from one of said arms; and a first retaining recess sized and positioned on one of said lateral walls to receive said post as said first member reaches the closed position;

and wherein said second retaining means comprises:

a second retaining recess sized and positioned on one of said lateral walls to receive said post as said first member reaches the open position, said first and second recesses being located substantially equidistant from said pivot recess.

13. The hinge defined in claim 12, wherein each of said pair of nubs extends a greater distance from said arm than said post.

14. The hinge defined in claim 12, wherein each of said first and second retaining recesses is substantially hemispherical, and wherein said post is substantially cylindrical.

15. The hinge defined in claim 12, wherein said second member hinge body includes a contact portion that contacts said first member when said second member is in the closed position, and wherein said first retaining recess is located on said lateral wall so that, as said first member moves to the closed position, said post is eccentrically received in said first retaining recess and thereby biases said door member toward the closed position.

16. The hinge defined in claim 12, wherein said first retaining means and said second retaining means are configured so that said first member pivots between about 100 and 160 degrees about said pivot axis as it moves from the operative position to the closed position.

17. The hinge defined in claim 12, wherein said second retaining means is configured so that said first member can move past the operative position to a resting position in which said first member hinge body pivots about said pivot axis between about 170 and 190 degrees from said closed position.

18. The hinge defined in claim 12, wherein said first member hinge body is arcuate and projects away from said pivot axis.

19. The hinge defined in claim 18, wherein said first member hinge body has a thickness of between about 1.0 and 2.0 millimeters and a radius of curvature of between about 250 and 400 millimeters.

20. A housing for a radiotelephone comprising:

a door member comprising a flexible hinge body and a pair of arms attached to and extending away from opposite lateral portions thereof;

a handset member including a hinge body and a pair of opposing lateral walls;

pivotal interconnecting means attached to each of said arms and each of said lateral walls for pivoting said door member about a pivot axis between a first closed position, in which said door member hinge body overlies said handset member hinge body, and an open operative position, wherein said door member hinge body and said handset member hinge body define an angle of between about 100 and 160 degrees, said pivot axis being generally perpendicular to a plane bisecting said door member hinge body equidistant between said arms;

first means for retaining said door member in the closed position;

second means for retaining said door member in the operative position;

wherein said first and second retaining means are configured so that as said first member moves between the open and the operative positions, said arms twist, thereby inducing a bending moment in said door member hinge body, and wherein said door member hinge body and said arms are configured so that in response to such twisting and bending moment, said door member hinge body preferentially flexes relative to said arms, thereby reducing the tendency for one of said arms to fracture.

21. The housing defined in claim 20, wherein said pivotal interconnecting means comprises:
  a pair of nubs, each of which is attached to one of said arms, and each of which extends from said arms so that its longitudinal axis coincides with said pivot axis; and
  a pair of receiving pivot recesses sized to receive said nubs, each of which is located in a respective one of said pair of lateral walls, and each of which is located on said pivot axis.

22. The housing defined in claim 21, wherein said first retaining means comprises:
  a post projecting from one of said arms; and
  a first retaining recess sized and positioned on one of said lateral walls to receive said post as said first member reaches the closed position;
  and wherein said second retaining means comprises
  a second retaining recess sized and positioned on one of said lateral walls to receive said post as said first member reaches the open position, said first and second recesses being located substantially equidistant from said pivot recess.

23. The housing defined in claim 22, wherein each of said pair of nubs extends a greater distance from said arm than said post.

24. The housing defined in claim 22, wherein each of said retaining recesses is substantially hemispherical, and wherein said post is substantially cylindrical.

25. The housing defined in claim 22, wherein said handset member hinge body includes a contact portion that contacts said door member when said door member is in the closed position, and wherein said first retaining recess is located on said lateral wall so that, as said door member moves to the closed position, said post is eccentrically received in said retaining recess and thereby biases said door member toward the closed position.

26. The housing defined in claim 22, wherein said first retaining means and said second retaining means are configured so that said door member pivots between about 120 and 150 degrees about said pivot axis as it moves from the operative position to the closed position.

27. The housing defined in claim 20, wherein said second retaining means is configured so that said door member can move past the operative position to a resting position in which said door member hinge body pivots about said pivot axis between about 170 and 190 degrees from said closed position.

28. The housing defined in claim 20, wherein said flexible hinge body is arcuate and projects away from said pivot axis.

29. The housing defined in claim 28, wherein said door member hinge body has a thickness of between about 1.0 and 2.0 millimeters a radius of curvature of between about 250 and 400 millimeters.

30. The housing defined in claim 20, wherein said door member is a flip cover for a cellular telephone.

31. The housing defined in claim 30 wherein said flip cover includes a cellular telephone microphone therein.

32. The housing defined in claim 31 wherein said housing is a cellular telephone housing.

33. The housing defined in claim 32 wherein said cellular telephone housing includes a cellular telephone transceiver, an antenna electrically connected thereto and a cellular telephone controller electrically connected thereto.

34. A hinge configuration comprising:
  an arcuate hinge body having a predetermined body width, a predetermined body thickness and a predetermined radius of curvature;
  a pair of arms, a respective one of which is attached to and extends away from a respective end of said arcuate hinge body, said pair of arms each having predetermined arm lengths and predetermined arm thicknesses;
  means for pivotally mounting said pair of arms on a housing such that said pair of arms twist upon pivotal movement of said arcuate hinge body relative to the housing;
  wherein said predetermined body width is between about 135 and 150 millimeters, said predetermined body thickness is between about 1.0 and 2.0 millimeters, said predetermined radius of curvature is between about 250 and 400 millimeters, said predetermined arm lengths are between about 10 and 20 millimeters, and said predetermined arm thicknesses are between about 1.0 and 3.5 millimeters to induce preferential deflection in said arcuate hinge body relative to said pair of arms upon twisting of said pair of arms during pivotal movement of said pair of arms, such that said pair of arms resist fracture during repeated pivotal movement.

35. The hinge configuration defined in claim 34 wherein said predetermined body width, predetermined body thickness, predetermined radius of curvature, predetermined arm lengths and predetermined arm thicknesses are further selected to produce sufficient lateral gripping force between said pair of arms such that said hinge member resists separation from said housing during repeated pivotal movement of said pair of arms.

* * * * *

UNITED STATES PATENT AND TRADEMARK OFFICE
CERTIFICATE OF CORRECTION

PATENT NO. : 5,507,013
DATED : April 9, 1996
INVENTOR(S) : Weadon et al.

It is certified that error appears in the above-identified patent and that said Letters Patent is hereby corrected as shown below:

Column 5, Line 53, delete "hub" and insert --nub--.

Signed and Sealed this

Twenty-fourth Day of September, 1996

Attest:

BRUCE LEHMAN

*Attesting Officer*          *Commissioner of Patents and Trademarks*